I. SIMPSON.
FRICTION DRAFT AND BUFFING MEMBERS.
APPLICATION FILED JUNE 1, 1908.

1,009,696.

Patented Nov. 21, 1911.

Witnesses:

Inventor
Isaac Simpson
By Fred W. Winter,
Attorney

UNITED STATES PATENT OFFICE.

ISAAC SIMPSON, OF EDGEWOOD PARK, PENNSYLVANIA, ASSIGNOR, BY DIRECT AND MESNE ASSIGNMENTS, TO THE WESTINGHOUSE AIR BRAKE COMPANY, OF PITTSBURGH, PENNSYLVANIA, A CORPORATION OF PENNSYLVANIA.

FRICTION DRAFT AND BUFFING MEMBERS.

1,009,696.   Specification of Letters Patent.   Patented Nov. 21, 1911.

Application filed June 1, 1908. Serial No. 435,896.

*To all whom it may concern:*

Be it known that I, ISAAC SIMPSON, a resident of Edgewood Park, in the county of Allegheny and State of Pennsylvania, have invented a new and useful Improvement in Friction Draft and Buffing Members, of which the following is a specification.

This invention relates to friction bearing plates or faces, such as used in friction draft gears and friction buffing devices of all kinds.

The object of the invention is to improve such friction bearing faces as to largely reduce the wear thereof and insure the same wearing down smoothly and to insure a uniform friction action at all times.

It is well known that in all friction draft gears and friction buffing devices, especially when large wide friction surfaces are used, the friction surfaces wear unevenly due to the fact that small particles of iron are worn off the softer of the surfaces by the friction action and accumulate on said friction surfaces. These particles of iron stick or adhere, as it were, to the part opposite the one from which they are worn, that is, to the harder one of the two friction elements. These adhering particles of the metal cut or dig into the softer friction element during the continued movements of the one upon the other and form lumpy or uneven surfaces. This causes the pressure to be concentrated on the lumps or high places, and not only creates an uneven and erratic frictional capacity in resisting shocks, but it frequently causes the friction gear to stick when in compression so that it fails to release, and it also very greatly shortens the life of the friction gear by cutting or digging the iron of the friction surfaces instead of wearing evenly over the entire area of such surfaces.

My invention is intended to overcome the foregoing defects in friction surfaces of draft gears, buffing devices, etc.

The invention consists in forming a number of grooves in one of the friction surfaces, preferably in the softer one thereof, said grooves being so arranged and positioned as to form exits for the escape of the particles of iron as they are worn off and prevent them from accumulating and sticking to the surfaces and forming lumps thereon as above stated.

Figure 1:
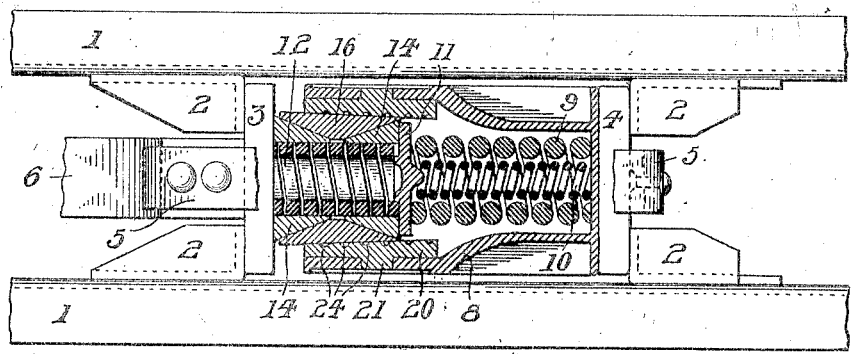
Figure 2:
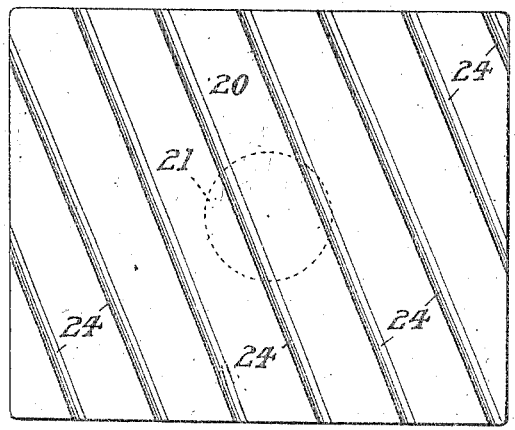
Figure 3:
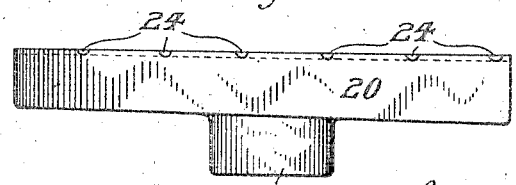

In the accompanying drawing Figure 1 is a horizontal sectional view of a friction draft gear having my improvement applied thereto; Fig. 2 is a surface view of one of the friction plates; and Fig. 3 is an edge view of the same.

My invention can be applied to friction draft gears or friction buffing devices of any type or character. In the drawings I have shown the invention applied to a friction draft gear of the kind covered by my Letters Patent No. 869,269, Oct. 29, 1907, but it will be understood that this particular form of friction draft gear has been merely selected as one of the large number of types to which the invention is applicable.

In the drawings the center sills or draft beams of the car are shown at 1. To these are applied, as usual, the draft lugs 2, against the forward pair of which bears the front follower plate 3 and against the rear pair bears the rear follower plate 4. These follower plates are embraced by the usual yoke 5 to which is connected the drawbar 6, all as is usual in friction draft mechanism.

The friction gear comprises the housing 8, shown as rectangular in cross section and provided with an integral or closed inner end. Within this housing are the posterior springs 9 and 10, one of which surrounds the other and one of which is considerably larger than the other. These springs at one end bear against the bottom or closed end of the housing 8, while at their other ends they bear against a partition plate 11 which is shown provided with a boss fitting into the end of the small spring and serving to position the springs and hold them against accidental displacement. Between the partition plate 11 and front follower plate 3 is the anterior spring 12, the coils of which preferably are square in cross section, as shown, but may be round, rectangular, or other shape, if desired.

Surrounding the spring 12 are four central wedge blocks 14, each of which is provided with a concave side fitting the spring and with an outer tapered surface. The blocks are arranged in pairs with the tapers facing each other, as shown in Fig. 1. In the normal position of the parts the bases of the blocks 14 are flush with the ends of the spring 12, while their tapered approximate ends are slightly spaced from each other. Lying between and embracing the four central wedge blocks are two lateral or outside wedge blocks 16, each of which is provided with two sloping faces bearing against the facing the tapered surfaces of the blocks 14. The outer face of each block 16 is slightly tapered.

Bearing against the outer faces of the blocks 16 are the outside or lateral friction plates or blocks 20 which are secured rigidly and preferably in a detachable manner within the housing 8. The drawing shows the connection formed by a boss 21 on each friction plate fitting within a socket in the housing. This detachable connection enables these friction plates to be removed when necessary and replaced by others, or so that liners may be inserted between them and the housing to compensate for wear due to long continued use. The friction plates 20 are also slightly tapered corresponding to the tapered outer faces on the wedge blocks 16.

This friction draft gear operates in the usual way and is described in my Letters Patent No. 869,269. In its operation practically the entire friction takes place between the outer faces of the blocks 16 and the inner faces of the plates 20. Preferably the blocks 16 are somewhat harder than the plates 20. My improvement is applied at these friction faces and consists in providing one of these faces, such as the inner faces of the plates 20, with a series of grooves 24 arranged in such a manner that the particles of metal which are ground off during the sliding action of the plates upon each other readily escape by gravity. These grooves might, if desired, be vertical but I prefer to have them inclined from the vertical so as to obviate all danger of the blocks 16 sticking or catching in said grooves. The size of the grooves and their distance apart may be varied within considerable limits. Satisfactory results have been obtained by grooves about ⅛ of an inch deep and about the same or slightly greater width and spaced about ¾ of an inch apart. These grooves are preferably formed in the softer ones of the friction members which, in the gear illustrated, are the plates 20.

By providing the grooves as shown the small particles of metal that are ground off by the sliding action of the plates in resisting buffing shocks, have a chance to escape and therefore do not lodge between the plates and adhere thereto and form the lumps which are so disastrous, not only to the life of the gear, but also make it unreliable and erratic in its resistance to stresses. These grooves can be formed upon a friction member of any shape or form and used in any type of friction draft gear, buffing device or the like. The arrangement of the grooves will depend upon the particular friction surfaces to which it is applied. Preferably they will be so arranged that the particles can escape by gravity. I wish it understood, therefore, that no limitations are to be imposed upon the terms of the claims hereinafter made either by reason of the specific construction and arrangement of friction members and grooves illustrated and described.

What I claim is:

1. Friction members for draft and buffer mechanism provided with contacting friction bearing faces, the bearing face of one of said members being provided with grooves arranged to permit the escape of particles of metal worn from the friction faces in the movement of one upon the other.

2. Friction members for draft and buffer mechanism provided with contacting friction bearing faces, the bearing face of one of said members being grooved and that of the other member being smooth.

3. Friction members for draft and buffer mechanism provided with contacting friction bearing faces, the bearing face of one of said members being provided with a series of grooves at an inclination from the horizontal to permit the escape of the particles of iron worn off from the parts in the movement of one part upon the other.

4. Friction members for draft and buffer mechanism provided with contacting friction bearing faces, one of said members being harder than the other, and the softer member having its bearing face provided with a series of grooves arranged to permit the escape of particles of iron worn from the parts in their movement upon each other.

In testimony whereof, I have hereunto set my hand.

ISAAC SIMPSON.

Witnesses:
 HOWARD NEELY,
 F. W. WINTERS.